(12) United States Patent
Perego et al.

(10) Patent No.: US 12,062,470 B2
(45) Date of Patent: Aug. 13, 2024

(54) ELECTRIC CABLE WITH IMPROVED THERMAL CONDUCTIVITY

(71) Applicant: NEXANS, Courbevoie (FR)

(72) Inventors: Gabriele Perego, Milan (IT); Christelle Mazel, Ruy (FR); Dimitri Charrier, Ecully (FR); Daphné Merle, Venissieux (FR)

(73) Assignee: NEXANS, Courbevoie (FR)

( * ) Notice: Subject to any disclaimer, the term of this patent is extended or adjusted under 35 U.S.C. 154(b) by 321 days.

(21) Appl. No.: 16/942,244

(22) Filed: Jul. 29, 2020

(65) Prior Publication Data

US 2021/0074451 A1 Mar. 11, 2021

(30) Foreign Application Priority Data

Jul. 30, 2019 (FR) ..................................... 19 08652

(51) Int. Cl.
| | |
|---|---|
| *H01B 3/00* | (2006.01) |
| *C08K 3/22* | (2006.01) |
| *C08L 23/14* | (2006.01) |
| *H01B 3/44* | (2006.01) |
| *H01B 7/02* | (2006.01) |
| *H01B 7/42* | (2006.01) |
| *H01B 13/14* | (2006.01) |

(52) U.S. Cl.
CPC ............... *H01B 7/428* (2013.01); *C08K 3/22* (2013.01); *C08L 23/14* (2013.01); *H01B 3/441* (2013.01); *H01B 7/0275* (2013.01); *H01B 13/14* (2013.01); *C08K 2003/2227* (2013.01); *C08K 2201/001* (2013.01); *C08K 2201/005* (2013.01); *C08L 2205/025* (2013.01); *C08L 2207/02* (2013.01)

(58) Field of Classification Search
CPC ........................................................ H01B 3/00
See application file for complete search history.

(56) References Cited

U.S. PATENT DOCUMENTS

| | | | |
|---|---|---|---|
| 6,162,548 A | 12/2000 | Castellani et al. | |
| 2002/0143089 A1* | 10/2002 | Minghetti | ............... C08K 3/22 524/558 |
| 2008/0271832 A1* | 11/2008 | Pieslak | ................... F16L 11/22 156/85 |
| 2013/0008691 A1 | 1/2013 | Shimada et al. | |
| 2013/0233604 A1 | 9/2013 | Perego et al. | |
| 2015/0147571 A1* | 5/2015 | Alexander | ............. C08L 23/04 524/517 |
| 2020/0005961 A1 | 1/2020 | Perego et al. | |

FOREIGN PATENT DOCUMENTS

| | | | |
|---|---|---|---|
| EP | 0015066 | * | 9/1980 |
| WO | 2019/117055 | | 6/2019 |

OTHER PUBLICATIONS

International Search Report dated May 7, 2020.

\* cited by examiner

*Primary Examiner* — Chau N Nguyen
(74) *Attorney, Agent, or Firm* — Sofer & Haroun, LLP

(57) ABSTRACT

A cable is provided having at least one electrically insulating layer obtained from a polymer composition with at least one polypropylene-based thermoplastic polymer material and at least one inorganic filler selected from aluminium oxide, a hydrated aluminium oxide, magnesium oxide, zinc oxide, and a mixture thereof; and a method for making the cable.

8 Claims, 1 Drawing Sheet

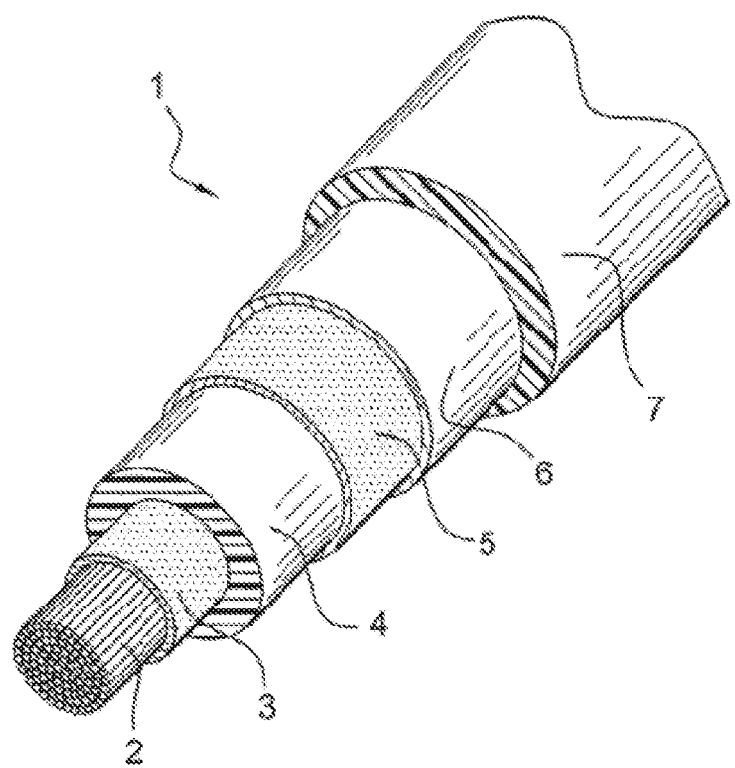

ELECTRIC CABLE WITH IMPROVED THERMAL CONDUCTIVITY

RELATED APPLICATION

This application claims the benefit of priority from French Patent Application No. 19 08652, filed on Jul. 30, 2019, the entirety of which is incorporated by reference.

FIELD OF THE INVENTION

The invention relates to a cable comprising at least one electrically insulating layer obtained from a polymer composition comprising at least one polypropylene-based thermoplastic polymer material and at least one inorganic filler preferably selected from aluminium oxide, a hydrated aluminium oxide, magnesium oxide, zinc oxide, and a mixture thereof; and a method for making said cable.

The invention applies typically but not exclusively to electric cables intended for power transmission, notably medium-voltage power cables (notably from 6 to 45-60 kV) or high-voltage power cables (notably above 60 kV, and which may be up to 400 kV), whether direct-current or alternating-current, in the fields of overhead, underwater, or terrestrial electricity transmission, or else aeronautics.

The invention applies in particular to electric cables having improved thermal conductivity.

DESCRIPTION OF RELATED ART

A medium-voltage or high-voltage power transmission cable preferably comprises, from the interior to the exterior:
an elongated electrically conducting element, notably made of copper or aluminium;
an internal semiconducting layer surrounding said elongated electrically conducting element;
an electrically insulating layer surrounding said internal semiconducting layer;
an external semiconducting layer surrounding said insulating layer,
optionally an electrical screen surrounding said external semiconducting layer, and
optionally an electrically insulating protective sheath surrounding said electrical screen.

The electrically insulating layer generally comprises at least one polyolefin such as an ethylene polymer (i.e. a homo- or copolymer of ethylene), crosslinked or non-crosslinked. The non-crosslinked ethylene polymers (e.g. non-crosslinked low-density polyethylene or non-crosslinked LDPE) cannot generally be used at temperatures above 70° C., and therefore reduce the cable's capacity to transport electrical energy in such a way as to avoid any overheating of the electrically insulating layer at temperatures above 70° C. Conversely, crosslinked ethylene polymers (e.g. XLPE) may be used up to temperatures of 90° C. However, these polymers are not easily recyclable, the crosslinking (vulcanization) process for producing a homogeneous layer is restrictive in terms of production cost, and/or production capacity. Finally, crosslinking may sometimes start prematurely in the extruder (screw, heater band) and/or the extruder head, leading to formation of particles of degraded XLPE in the extruder (also called "scorch"), which may then migrate into the electrically insulating layer or into the semiconducting layer of the cable and create defects there. The presence of these particles then affects the final properties of the cable. This phenomenon is known by the English name "scorch phenomena".

The propylene polymers generally have properties of thermal conductivity slightly below those of the ethylene polymers. Consequently, their use may lead to a decrease in removal of the heat generated by the Joule effect, and thus in the amount of energy transported, the latter being a function of the maximum acceptable temperature of the elongated electrically conducting element.

To overcome this problem, international application WO2018167442A1 describes an electric cable comprising at least one elongated electrically conducting element and at least one electrically insulating layer obtained from a polymer composition comprising at least one polypropylene-based thermoplastic polymer material and at least one inorganic filler such as kaolin or chalk. However, the mechanical properties of the cable thus obtained are not optimized.

OBJECTS AND SUMMARY

The aim of the present invention is consequently to overcome the drawbacks of the techniques of the prior art by proposing an electric cable, notably medium-voltage or high-voltage, based on propylene polymer(s), said cable, which is able to operate at temperatures above 70° C., having improved mechanical properties, notably in terms of elongation at break and tensile strength, while guaranteeing good thermal conductivity.

This aim is achieved by the invention that will be described below.

The first object of the invention is an electric cable comprising at least one elongated electrically conducting element and at least one electrically insulating layer obtained from a polymer composition comprising at least one polypropylene-based thermoplastic polymer material and at least one inorganic filler, characterized in that the inorganic filler is notably a metal oxide, whether or not hydrated, said inorganic filler preferably being selected from aluminium oxide, a hydrated aluminium oxide, magnesium oxide, zinc oxide, and a mixture thereof.

The combination of a polypropylene-based thermoplastic polymer material with the inorganic filler as defined in the invention makes it possible to obtain an electrically insulating layer having improved mechanical properties, notably in terms of elongation at break and tensile strength, while guaranteeing good thermal conductivity, or even better thermal conductivity.

A mixture of the inorganic fillers is preferably a mixture of two or three of said inorganic fillers.

In the present invention, aluminium oxide, also commonly known as "alumina", is a chemical compound of formula $Al_2O_3$.

Hydrated aluminium oxide or hydrated alumina may be an aluminium oxide monohydrate or polyhydrate, and preferably monohydrate or trihydrate.

As examples of aluminium oxide monohydrate, we may mention boehmite, which is the gamma polymorph of AlO(OH) or $Al_2O_3 \cdot H_2O$; or diaspore, which is the alpha polymorph of AlO(OH) or $Al_2O_3 \cdot H_2O$.

As examples of aluminium oxide polyhydrate, and preferably trihydrate, we may mention gibbsite or hydrargillite, which is the gamma polymorph of $Al(OH)_3$; bayerite, which is the alpha polymorph of $Al(OH)_3$; or nordstrandite, which is the beta polymorph of $Al(OH)_3$.

Hydrated aluminium oxide is also well known by the name "aluminium oxide hydroxide" or "alumina hydroxide".

Aluminium oxide is preferred as the inorganic filler.

The aluminium oxide (or magnesium oxide) is notably a calcined aluminium oxide (or a calcined magnesium oxide, respectively).

In the present invention, the inorganic filler may represent at least about 1 wt %, preferably at least about 2 wt %, especially preferably at least about 5 wt %, and more especially preferably at least about 10 wt %, relative to the total weight of the polymer composition.

The inorganic filler preferably represents at most about 40 wt %, especially preferably at most about 30 wt %, and more especially preferably at most about 25 wt %, relative to the total weight of the polymer composition.

The inorganic filler may be in the form of particles ranging in size from about 0.01 to 6 μm, preferably from about 0.05 to 2 μm, especially preferably from about 0.075 to 1.5 μm, and more especially preferably from about 0.1 to 1.1 μm.

When considering several particles of inorganic filler according to the invention, the term "size" signifies the number-average size of the set of particles of a given population, this size being determined conventionally by methods that are familiar to a person skilled in the art.

The size of the particle or particles according to the invention may be determined for example by microscopy, notably by scanning electron microscope (SEM) or by transmission electron microscope (TEM).

According to a preferred embodiment of the invention, the inorganic filler may comprise a mixture of particles ranging in size from about 0.01 to 0.50 μm, and preferably from about 0.05 to 0.25 μm; and of particles ranging in size from about 0.60 to 2 μm, and preferably from about 0.75 to 1.5 μm.

The inorganic filler may be "treated" or "untreated", and is preferably "treated".

"Treated inorganic filler" means an inorganic filler that has undergone a surface treatment, or in other words, a surface-treated inorganic filler. Said surface treatment notably allows the surface properties of the inorganic filler to be modified, for example to improve the compatibility of the inorganic filler with the thermoplastic polymer material.

In a preferred embodiment, the inorganic filler of the invention may be silanized, or in other words may be treated to obtain a silanized inorganic filler.

The surface treatment used for obtaining the silanized inorganic filler is notably a surface treatment starting from at least one silane compound (with or without coupling agent), this type of surface treatment being familiar to a person skilled in the art.

Thus, the silanized inorganic filler of the invention may comprise siloxane and/or silane groups on its surface. Said groups may be of the vinylsilane, alkylsilane, epoxysilane, methacryloxysilane, acryloxysilane, aminosilane or mercaptosilane type.

The silane compound used for obtaining the silanized inorganic filler may be selected from:
  alkyltrimethoxysilanes or alkyltriethoxysilanes, such as for example octadecyltrimethoxysilane (OdTMS—C18), octyl(triethoxy)silane (OTES—C8), methyl trimethoxysilane, hexadecyl trimethoxysilane,
  vinyltrimethoxysilanes or vinyltriethoxysilanes,
  methacryloxylsilanes or acryloxysilanes, such as for example 3-methacryloxypropyl methyldimethoxysilane, 3-methacryloxypropyl trimethoxysilane, 3-methacryloxypropyl trimethoxysilane, 3-acryloxypropyl trimethoxysilane, and
  a mixture thereof.

The inorganic filler may have a specific surface area by the BET method from about 1 to 20 g/cm$^2$, and preferably from about 7.5 to 17 g/cm$^2$.

In the present invention, the specific surface area of the inorganic filler may easily be determined according to standard DIN 9277 (2010).

According to a preferred embodiment of the invention, the inorganic filler may comprise a mixture of particles of specific surface area from about 2 to 9 g/cm$^2$, and particles of specific surface area from about 10 to 17 g/cm$^2$.

The polypropylene-based thermoplastic polymer material may comprise a propylene homopolymer or copolymer $P_1$, and preferably a propylene copolymer $P_1$.

The propylene homopolymer $P_1$ preferably has an elastic modulus from about 1250 to 1600 MPa.

The propylene homopolymer $P_1$ may represent at least 10 wt %, and preferably from 15 to 30 wt %, relative to the total weight of the polypropylene-based thermoplastic polymer material.

As examples of propylene copolymers $P_1$, we may mention the copolymers of propylene and olefin, the olefin notably being selected from ethylene and an $\alpha_1$ olefin different from propylene.

The ethylene or the $\alpha_1$ olefin different from propylene of the copolymer of propylene and olefin preferably represents at most about 15 mol %, and especially preferably at most about 10 mol %, relative to the total number of moles of copolymer of propylene and olefin.

The $\alpha_1$ olefin different from propylene may correspond to the formula $CH_2=CH-R^1$, in which $R^1$ is a linear or branched alkyl group having from 2 to 12 carbon atoms, notably selected from the following olefins: 1-butene, 1-pentene, 4-methyl-1-pentene, 1-hexene, 1-octene, 1-decene, 1-dodecene, and a mixture thereof.

The copolymers of propylene and ethylene are preferred as the propylene copolymer $P_1$.

The propylene copolymer $P_1$ may be a random propylene copolymer or a heterophase propylene copolymer, and is preferably a heterophase propylene copolymer.

In the invention, the random propylene copolymer $P_1$ preferably has an elastic modulus from about 600 to 1200 MPa.

As an example of a random propylene copolymer $P_1$, we may mention that marketed by the company Borealis under the reference Bormed® RB 845 MO.

The heterophase propylene copolymer $P_1$ may comprise a thermoplastic phase of the propylene type and a thermoplastic elastomer phase of the ethylene/$\alpha_z$ olefin copolymer type.

The $\alpha_2$ olefin of the thermoplastic elastomer phase of the heterophase propylene copolymer $P_1$ may be propylene.

The thermoplastic elastomer phase of the heterophase propylene copolymer $P_1$ may represent at least about 20 wt %, and preferably at least about 45 wt %, relative to the total weight of the heterophase propylene copolymer $P_1$.

The heterophase propylene copolymer $P_1$ preferably has an elastic modulus from about 50 to 1200 MPa, and especially preferably: either an elastic modulus from about 50 to 550 MPa, and more especially preferably from about 50 to 300 MPa; or an elastic modulus from about 600 to 1200 MPa.

As examples of heterophase propylene copolymer, we may mention the heterophase propylene copolymer marketed by the company LyondellBasell under the reference Adflex® Q 200 F, or the heterophase copolymer marketed by the company LyondellBasell under the reference EP® 2967.

The propylene homopolymer or copolymer $P_1$ may have a melting point above about 110° C., preferably above about 130° C., especially preferably above about 140° C., and more especially preferably from about 140 to 170° C.

The propylene homopolymer or copolymer $P_1$ may have an enthalpy of fusion from about 20 to 100 J/g.

The propylene homopolymer $P_1$ may have an enthalpy of fusion from about 80 to 90 J/g.

The random propylene copolymer $P_1$ may have an enthalpy of fusion from about 40 to 80 J/g.

The heterophase propylene copolymer $P_1$ may have an enthalpy of fusion from about 20 to 50 J/g.

The propylene homopolymer or copolymer $P_1$ may have a melt flow index from 0.5 to 3 g/10 min, measured at about 230° C. with a load of about 2.16 kg according to standard ASTM D1238-00.

The random propylene copolymer $P_1$ may have a melt flow index from 1.2 to 2.5 g/10 min, and preferably from 1.5 to 2.5 g/10 min, measured at about 230° C. with a load of about 2.16 kg according to standard ASTM D1238-00.

The heterophase propylene copolymer $P_1$ may have a melt flow index from 0.5 to 1.5 g/10 min, and preferably from about 0.5 to 1.4 g/10 min, measured at about 230° C. with a load of about 2.16 kg according to standard ASTM D1238-00.

The polypropylene-based thermoplastic polymer material may comprise several different propylene copolymers $P_1$, notably two different propylene copolymers $P_1$, said propylene copolymers $P_1$ being as defined above.

In particular, the polypropylene-based thermoplastic polymer material may comprise a random propylene copolymer (as first propylene copolymer $P_1$) and a heterophase propylene copolymer (as second propylene copolymer $P_1$), or two different heterophase propylene copolymers.

When the polypropylene-based thermoplastic polymer material comprises a random propylene copolymer and a heterophase propylene copolymer, said heterophase propylene copolymer preferably has an elastic modulus from about 50 to 300 MPa.

According to one embodiment of the invention, the two heterophase propylene copolymers have a different elastic modulus. Preferably, the polypropylene-based thermoplastic polymer material comprises a first heterophase propylene copolymer having an elastic modulus from about 50 to 550 MPa, and especially preferably from about 50 to 300 MPa; and a second heterophase propylene copolymer having an elastic modulus from about 600 to 1200 MPa.

Advantageously, the first and second heterophase propylene copolymers have a melt flow index as defined in the invention.

These combinations of propylene copolymers $P_1$ may advantageously make it possible to improve the mechanical properties of the polymer layer. In particular, the combination makes it possible to obtain optimized mechanical properties of the polymer layer, notably in terms of elongation at break, and flexibility; and/or makes it possible to form a more homogeneous polymer layer, and notably promotes dispersion of the dielectric liquid in the polypropylene-based thermoplastic polymer material of said polymer layer.

According to a preferred embodiment of the invention, the propylene copolymer $P_1$ or the propylene copolymers $P_1$ when there are several of them, represent(s) at least about 50 wt %, preferably from about 55 to 90 wt %, and especially preferably from about 60 to 90 wt %, relative to the total weight of the polypropylene-based thermoplastic polymer material.

The random propylene copolymer $P_1$ may represent at least 20 wt %, and preferably from 30 to 70 wt %, relative to the total weight of the polypropylene-based thermoplastic polymer material.

The heterophase propylene copolymer $P_1$ or the heterophase propylene copolymers $P_1$ when there are several of them, may represent from about 5 to 95 wt %, preferably from about 50 to 90 wt %, and especially preferably from about 60 to 80 wt %, relative to the total weight of the polypropylene-based thermoplastic polymer material.

The polypropylene-based thermoplastic polymer material may further comprise an olefin homopolymer or copolymer $P_2$.

Said olefin homopolymer or copolymer $P_2$ is preferably different from said propylene homopolymer or copolymer $P_1$.

The olefin of the olefin copolymer $P_2$ may be selected from ethylene and an $\alpha_3$ olefin corresponding to the formula $CH_2=CH-R^2$, in which $R^2$ is a linear or branched alkyl group having from 1 to 12 carbon atoms.

The $\alpha_3$ olefin is preferably selected from the following olefins: propylene, 1-butene, isobutylene, 1-pentene, 4-methyl-1-pentene, 1-hexene, 1-octene, 1-decene, 1-dodecene, and a mixture thereof.

The $\alpha_3$ olefin of the propylene, 1-hexene or 1-octene type is particularly preferred.

The combination of polymers $P_1$ and $P_2$ makes it possible to obtain a thermoplastic polymer material having good mechanical properties, notably in terms of elastic modulus, and electrical properties.

The olefin homopolymer or copolymer $P_2$ is preferably an ethylene polymer.

According to a preferred embodiment of the invention, the ethylene polymer is a low-density polyethylene, a low-density linear polyethylene, a medium-density polyethylene, or a high-density polyethylene, and preferably a high-density polyethylene; notably according to standard ISO 1183A (at a temperature of 23° C.).

The ethylene polymer preferably has an elastic modulus of at least 400 MPa, and especially preferably at least 500 MPa.

In the present invention, the elastic modulus or Young's modulus of a polymer (known by the English term "Tensile Modulus") is well known by a person skilled in the art, and may easily be determined according to standard ISO 527-1, -2 (2012). Standard ISO 527 has a first part, designated "ISO 527-1", and a second part, designated "ISO 527-2" specifying the test conditions relating to the general principles of the first part of standard ISO 527.

In the present invention, the expression "low-density" signifies having a density from about 0.91 to 0.925 g/cm³, said density being measured according to standard ISO 1183A (at a temperature of 23° C.).

In the present invention, the expression "medium-density" signifies having a density from about 0.926 to 0.940 g/cm³, said density being measured according to standard ISO 1183A (at a temperature of 23° C.).

In the present invention, the expression "high-density" signifies having a density from 0.941 to 0.965 g/cm³, said density being measured according to standard ISO 1183A (at a temperature of 23° C.).

According to a preferred embodiment of the invention, the olefin homopolymer or copolymer $P_2$ represents from about 5 to 50 wt %, and especially preferably from about 10 to 40 wt %, relative to the total weight of the polypropylene-based thermoplastic polymer material.

According to an especially preferred embodiment of the invention, the polypropylene-based thermoplastic polymer material comprises two propylene copolymers $P_1$ such as a random propylene copolymer and a heterophase propylene copolymer or two different heterophase propylene copolymers; and an olefin homopolymer or copolymer $P_2$ such as an ethylene polymer. This combination of propylene copolymers $P_1$ and of an olefin homopolymer or copolymer $P_2$ offers the possibility of further improvement of the mechanical properties of the polymer layer, while guaranteeing good thermal conductivity.

The thermoplastic polymer material of the polymer composition of the electrically insulating layer of the cable of the invention is preferably heterophase (i.e. it comprises several phases). The presence of several phases generally results from mixing two different polyolefins, such as a mixture of different propylene polymers or a mixture of a propylene polymer and an ethylene polymer.

The polymer composition of the invention may further comprise a dielectric liquid, notably forming an intimate mixture with the thermoplastic polymer material.

The dielectric liquid improves the interface inorganic filler/polypropylene-based thermoplastic polymer material. The presence of the dielectric liquid enables to obtain better dielectric properties (i.e. better electrical insulation), and notably better dielectric strength of the layer obtained from the polymer composition. It can also allow improving mechanical properties and/or ageing resistance of said layer.

As examples of dielectric liquid, we may mention mineral oils (e.g. naphthenic oils, paraffinic oils or aromatic oils), vegetable oils (e.g. soya oil, linseed oil, colza oil, maize oil or castor oil) or synthetic oils such as aromatic hydrocarbons (alkylbenzenes, alkylnaphthalenes, alkylbiphenyls, alkydiarylethylenes, etc.), silicone oils, ether oxides, organic esters or aliphatic hydrocarbons, or mixtures thereof.

The dielectric liquid preferably comprises at least one mineral oil.

According to a particular embodiment, the dielectric liquid represents from about 1 to 20 wt %, preferably from about 2 to 15 wt %, and especially preferably from about 3 to 12 wt %, relative to the total weight of the polypropylene-based thermoplastic polymer material.

The dielectric liquid may comprise at least about 70 wt % of mineral oil, and preferably at least about 80 wt % of mineral oil, relative to the total weight of the dielectric liquid.

The mineral oil is generally liquid at about 20-25° C.

The mineral oil is preferably selected from naphthenic oils and paraffinic oils.

The mineral oil is obtained from the refining of a petroleum crude.

According to an especially preferred embodiment of the invention, the mineral oil comprises a content of paraffinic carbon (cP) from about 45 to 65 at %, a content of naphthenic carbon (nC) from about 35 to 55 at % and a content of aromatic carbon (aC) from about 0.5 to 10 at %.

The dielectric liquid advantageously comprises a mineral oil, notably as defined in the invention, and at least one polar compound of the type benzophenone, acetophenone or a derivative thereof.

In a particular embodiment, the polar compound of the type benzophenone, acetophenone or a derivative thereof represents at least about 2.5 wt %, preferably at least about 3.5 wt %, and especially preferably at least about 4 wt %, relative to the total weight of the dielectric liquid.

The dielectric liquid may comprise at most about 30 wt %, preferably at most about 20 wt %, and even more preferably at most about 15 wt %, of polar compound of the type benzophenone, acetophenone or a derivative thereof, relative to the total weight of the dielectric liquid. This maximum amount makes it possible to guarantee moderate, or even low (e.g. below about $10^{-3}$) dielectric losses, as well as prevent migration of the dielectric liquid out of the electrically insulating layer.

According to a preferred embodiment of the invention, the polar compound of the type benzophenone, acetophenone or a derivative thereof is selected from benzophenone, dibenzosuberone, fluorenone and anthrone. Benzophenone is particularly preferred.

The polypropylene-based thermoplastic polymer material may further comprise one or more additives.

The additives are well known by a person skilled in the art and may be selected from agents favouring application, such as lubricants, compatibilizers, or coupling agents, antioxidants, anti-UV agents, anti-copper agents, anti-water treeing agents, pigments, and a mixture thereof.

The polypropylene-based thermoplastic polymer material may typically comprise from about 0.01 to 5 wt %, and preferably from about 0.1 to 2 wt % of additives, relative to the total weight of the polypropylene-based thermoplastic polymer material.

More particularly, the antioxidants make it possible to protect the polymer composition from the thermal stresses generated during the steps of manufacture of the cable or operation of the cable.

The antioxidants are preferably selected from hindered phenols, thioesters, sulphur-based antioxidants, phosphorus-based antioxidants, antioxidants of the amine type, and a mixture thereof.

As examples of hindered phenols, we may mention 1,2-bis(3,5-di-tert-butyl-4-hydroxyhydrocinnamoyl)hydrazine (Irganox® MD 1024), pentaerythritol tetrakis(3-(3,5-di-tert-butyl-4-hydroxyphenyl)propionate) (Irganox® 1010), octadecyl 3-(3,5-di-tert-butyl-4-hydroxyphenyl)propionate (Irganox® 1076), 1,3,5-trimethyl-2,4,6-tris(3,5-di-tert-butyl-4-hydroxybenzyl)benzene (Irganox® 1330), 4,6-bis(octylthiomethyl)-o-cresol (Irgastab® KV10 or Irganox® 1520), 2,2'-thiobis(6-tert-butyl-4-methylphenol) (Irganox® 1081), 2,2'-thiodiethylene bis[3-(3,5-di-tert-butyl-4-hydroxyphenyl)propionate] (Irganox® 1035), tris(3,5-di-tert-butyl-4-hydroxybenzyl)isocyanurate (Irganox® 3114), 2,2'-oxamido-bis(ethyl-3(3,5-di-tert-butyl-4-hydroxyphenyl) propionate) (Naugard XL-1), or 2,2'-methylenebis(6-tert-butyl-4-methylphenol).

As examples of sulphur-based antioxidants, we may mention thioethers such as didodecyl-3,3'-thiodipropionate (Irganox® PS800), distearyl thiodipropionate or dioctadecyl-3,3'-thiodipropionate (Irganox® PS802), bis[2-methyl-4-{3-n-alkyl ($C_{12}$ or $C_{14}$) thiopropionyloxy}-5-tert-butylphenyl] sulphide, thiobis-[2-tert-butyl-5-methyl-4,1-phenylene] bis [3-(dodecylthio)propionate], or 4,6-bis(octylthiomethyl)-o-cresol (Irganox® 1520 or Irgastab® KV10).

As examples of phosphorus-based antioxidants, we may mention tris(2,4-di-tert-butylphenyl)phosphite (Irgafos® 168) or bis(2,4-di-tert-butylphenyl)pentaerythritol diphosphite (Ultranox® 626).

As examples of antioxidants of the amine type, we may mention phenylene diamines (e.g. paraphenylene diamines such as 1PPD or 6PPD), diphenylamine styrene, diphenylamines, 4-(1-methyl-1-phenylethyl)-N-[4-(1-methyl-1-phenylethyl)phenyl]aniline (Naugard 445), mercapto benzimidazoles, or polymerized 2,2,4-trimethyl-1,2-dihydroquinoline (TMQ).

As examples of mixtures of antioxidants usable according to the invention, we may mention Irganox B 225, which comprises an equimolar mixture of Irgafos 168 and Irganox 1010 as described above.

The polymer composition of the electrically insulating layer of the invention is a thermoplastic polymer composition. Therefore it is not crosslinkable.

In particular, the polymer composition does not comprise crosslinking agents, coupling agents of the silane type, peroxides and/or additives that allow crosslinking. In fact such agents degrade the polypropylene-based thermoplastic polymer material.

The polymer composition is preferably recyclable.

The polymer composition may further comprise at least one inorganic filler different from the inorganic filler selected from aluminium oxide, a hydrated aluminium oxide, magnesium oxide, zinc oxide, and a mixture thereof, such as talc, aluminium trihydrate $Al(OH)_3$, or magnesium dihydrate $Mg(OH)_2$; and/or at least one halogen-free mineral filler intended to improve the fire behaviour of the polymer composition.

The inorganic filler different from the inorganic filler selected from aluminium oxide, a hydrated aluminium oxide, magnesium oxide, zinc oxide, and a mixture thereof, and/or the halogen-free mineral filler may represent at most about 30 wt %, preferably at most about 20 wt %, especially preferably at most about 10 wt %, and more especially preferably at most about 5 wt %, relative to the total weight of the polymer composition.

In order to guarantee a so-called "HFFR" electric cable ("Halogen-Free Flame Retardant"), the cable of the invention preferably does not comprise halogenated compounds. These halogenated compounds may be of all kinds, such as for example fluorinated polymers or chlorinated polymers such as polyvinyl chloride (PVC), halogenated plasticizers, halogenated mineral fillers, etc.

The polymer composition may be prepared by mixing the polypropylene-based thermoplastic polymer material with at least one inorganic filler selected from aluminium oxide, a hydrated aluminium oxide, magnesium oxide, zinc oxide, and a mixture thereof, optionally a dielectric liquid and optionally one or more additives as defined in the invention.

The electrically insulating layer of the cable of the invention is a non-crosslinked layer or in other words a thermoplastic layer.

In the invention, the expression "non-crosslinked layer" or "thermoplastic layer" signifies a layer whose gel content according to standard ASTM D2765-01 (xylene extraction) is at most about 30%, preferably at most about 20%, especially preferably at most about 10%, more particularly preferably at most 5%, and even more especially preferably 0%.

In one embodiment of the invention, the electrically insulating layer, preferably non-crosslinked, has a thermal conductivity of at least 0.30 W/m·K at 40° C., preferably at least 0.31 W/m·K at 40° C., especially preferably at least 0.32 W/m·K at 40° C., more especially preferably at least 0.33 W/m·K at 40° C., even more especially preferably at least 0.34 W/m·K at 40° C., and even more especially preferably at least 0.35 W/m·K at 40° C.

The thermal conductivity is preferably measured by the method that is well known by the English term "Transient Plane Source or TPS". Advantageously, the thermal conductivity is measured using an instrument marketed under the reference HOT DISK TPS 2500S by the company THERMOCONCEPT.

In a particular embodiment, the electrically insulating layer, preferably non-crosslinked, has a tensile strength (TS) of at least 8.5 MPa, preferably at least about 10 MPa, and especially preferably at least about 15 MPa, before ageing (according to standard CEI 20-86).

In a particular embodiment, the electrically insulating layer, preferably non-crosslinked, has an elongation at break (EB) of at least about 250%, preferably at least about 300%, and especially preferably at least about 350%, before ageing (according to standard CEI 20-86).

In a particular embodiment, the electrically insulating layer, preferably non-crosslinked, has a tensile strength (TS) of at least 8.5 MPa, preferably at least about 10 MPa, and especially preferably of at least about 15 MPa, after ageing (according to standard CEI 20-86).

In a particular embodiment, the electrically insulating layer, preferably non-crosslinked, has an elongation at break (EB) of at least about 250%, preferably at least about 300%, and especially preferably at least about 350%, after ageing (according to standard CEI 20-86).

The tensile strength (TS) and the elongation at break (EB) (before or after ageing) may be determined according to standard NF EN 60811-1-1, notably using an instrument marketed under the reference 3345 by the company Instron.

Ageing is generally carried out at 135° C. for 240 hours (or 10 days).

The electrically insulating layer of the cable of the invention is preferably a recyclable layer.

The electrically insulating layer of the invention may be an extruded layer, notably by methods well known by a person skilled in the art.

The electrically insulating layer has a variable thickness depending on the type of cable envisaged. In particular, when the cable according to the invention is a medium-voltage cable, the thickness of the electrically insulating layer is typically from about 4 to 5.5 mm, and more particularly about 4.5 mm. When the cable according to the invention is a high-voltage cable, the thickness of the electrically insulating layer typically varies from 17 to 18 mm (for voltages of the order of about 150 kV) and up to thicknesses from about 20 to 25 mm for voltages above 150 kV (high-voltage cables). The aforementioned thicknesses depend on the size of the elongated electrically conducting element.

In the present invention, "electrically insulating layer" means a layer whose electrical conductivity may be of at most $1.10^{-8}$ S/m (siemens per metre), preferably at most $1.10^{-9}$ S/m, and especially preferably at most $1.10^{-10}$ S/m, measured at about 25° C. with direct current.

The polymer composition may then comprise less than about 6 wt % of electrically conductive filler, preferably less than about 1 wt % of electrically conductive filler, and especially preferably about 0 wt % of electrically conductive filler, relative to the total weight of the polymer composition.

The electrically conductive filler may be selected from carbon blacks, graphites, and a mixture thereof.

The electrically insulating layer of the invention may comprise at least one polypropylene-based thermoplastic polymer material, at least one inorganic filler selected from aluminium oxide, a hydrated aluminium oxide, magnesium oxide, zinc oxide, and a mixture thereof, one or more additives, optionally at least one inorganic filler different from the inorganic filler selected from aluminium oxide, a hydrated aluminium oxide, magnesium oxide, zinc oxide, and a mixture thereof, and optionally at least one halogen-free mineral filler intended to improve the fire behaviour of the polymer composition, the aforementioned ingredients being as defined in the invention.

The proportions of the various ingredients in the electrically insulating layer may be identical to those as described in the invention for these same ingredients in the polymer composition.

The cable of the invention relates more particularly to the field of electric cables operating with direct current (DC) or with alternating current (AC).

The electrically insulating layer of the invention may surround the elongated electrically conducting element.

The elongated electrically conducting element is preferably located at the centre of the cable.

The elongated electrically conducting element may be a single-core conductor such as for example a metal wire or a multicore conductor such as a plurality of metal wires, twisted or not.

The elongated electrically conducting element may be of aluminium, aluminium alloy, copper, copper alloy, or a combination thereof.

According to a preferred embodiment of the invention, the electric cable comprises:
at least one semiconducting layer surrounding the elongated electrically conducting element, and
an electrically insulating layer as defined in the invention.

The electrically insulating layer has more particularly an electrical conductivity lower than that of the semiconducting layer. More particularly, the electrical conductivity of the semiconducting layer may be at least 10 times greater than the electrical conductivity of the electrically insulating layer, preferably at least 100 times greater than the electrical conductivity of the electrically insulating layer, and especially preferably at least 1000 times greater than the electrical conductivity of the electrically insulating layer.

The semiconducting layer may surround the electrically insulating layer. The semiconducting layer may then be an external semiconducting layer.

The electrically insulating layer may surround the semiconducting layer.

The semiconducting layer may then be an internal semiconducting layer.

The semiconducting layer is preferably an internal semiconducting layer.

The electric cable of the invention may further comprise another semiconducting layer.

Thus, in this embodiment, the cable of the invention may comprise:
at least one elongated electrically conducting element, preferably located at the centre of the cable,
a first semiconducting layer surrounding the elongated electrically conducting element,
an electrically insulating layer surrounding the first semiconducting layer, and
a second semiconducting layer surrounding the electrically insulating layer,
the electrically insulating layer being as defined in the invention.

In the present invention, "semiconducting layer" means a layer whose electrical conductivity may be strictly above $1.10^{-8}$ S/m (siemens per metre), preferably at least $1.10^{-3}$ S/m, and preferably may be below $1.10^{3}$ S/m, measured at 25° C. in direct current.

In a particular embodiment, the first semiconducting layer, the electrically insulating layer and the second semiconducting layer make up a three-layer insulation. In other words, the electrically insulating layer is in direct physical contact with the first semiconducting layer, and the second semiconducting layer is in direct physical contact with the electrically insulating layer.

The first semiconducting layer (or, respectively, the second semiconducting layer) is preferably obtained from a polymer composition comprising at least one polypropylene-based thermoplastic polymer material as defined in the invention, and optionally at least one electrically conductive filler as defined in the invention.

The electrically conductive filler preferably represents a sufficient amount for the layer to be semiconducting.

Preferably, the polymer composition may comprise at least about 6 wt % of electrically conductive filler, preferably at least about 10 wt % of electrically conductive filler, preferably at least about 15 wt % of electrically conductive filler, and even more preferably at least about 25 wt % of electrically conductive filler, relative to the total weight of the polymer composition.

The polymer composition may comprise at most about 45 wt % of electrically conductive filler, and preferably at most about 40 wt % of electrically conductive filler, relative to the total weight of the polymer composition.

The first semiconducting layer (or, respectively, the second semiconducting layer) is preferably a thermoplastic layer or a non-crosslinked layer.

The cable may further comprise an outer protective sheath surrounding the electrically insulating layer (or the second semiconducting layer if present).

The outer protective sheath may be in direct physical contact with the electrically insulating layer (or the second semiconducting layer if present).

The outer protective sheath may be an electrically insulating sheath.

The electric cable may further comprise an electrical screen (e.g. metallic) surrounding the second semiconducting layer. In this case, the electrically insulating sheath surrounds said electrical screen and the electrical screen is between the electrically insulating sheath and the second semiconducting layer.

This metal screen may be a so-called "wire" screen made up of an assembly of copper or aluminium conductors arranged around and along the second semiconducting layer, a so-called "taped" screen made up of one or more copper or aluminium conductive metal tapes optionally placed helically around the second semiconducting layer or an aluminium conductive metal tape placed longitudinally around the second semiconducting layer and made impervious with glue in the zones where parts of said tape overlap, or a so-called "impervious" screen of the metal tube type optionally consisting of lead or lead alloy and surrounding the second semiconducting layer. This last-mentioned type of screen notably provides a barrier to moisture, which tends to penetrate the electric cable in the radial direction.

The metal screen of the electric cable of the invention may comprise a so-called "wire" screen and a so-called "impervious" screen or a so-called "wire" screen and a so-called "taped" screen.

All the types of metal screens may perform the role of earthing the electric cable and may thus carry away fault currents, for example in the case of short-circuit in the network in question.

Other layers, such as layers that swell in the presence of moisture, may be added between the second semiconducting layer and the metal screen, these layers ensuring longitudinal imperviousness of the electric cable to water.

The second object of the invention is a method of manufacturing an electric cable according to the first object of the invention, characterized in that it comprises at least one step 1) of extrusion of a polymer composition as defined in the first object of the invention around an elongated electrically conducting element, to obtain an electrically insulating layer (extruded) surrounding said elongated electrically conducting element.

Step 1) may be carried out by techniques familiar to a person skilled in the art, for example using an extruder.

In step 1), the composition leaving the extruder is called "non-crosslinked", the temperature as well as the residence time within the extruder being optimized in consequence.

At the outlet of the extruder, an extruded layer is therefore obtained around said electrically conducting element, which may or may not be in direct physical contact with said elongated electrically conducting element.

The method preferably does not comprise a step of crosslinking the layer obtained in step 1).

The electrically insulating layer and/or the semiconducting layer or layers of the electric cable of the invention may be obtained by successive extrusion or by co-extrusion.

Prior to extrusion of each of these layers around at least one elongated electrically conducting element, all of the constituents required for formation of each of these layers may be metered and mixed in a continuous mixer of the BUSS co-kneader type, twin-screw extruder or some other type of mixer suitable for polymer mixtures, notably with fillers. The mixture may then be extruded in the form of rods, and then cooled and dried to be granulated, or the mixture may be granulated directly, by techniques familiar to a person skilled in the art. The granules may then be fed into a single-screw extruder in order to extrude and deposit the composition around the elongated electrically conducting element to form the layer in question.

The various compositions may be extruded one after another to surround the elongated electrically conducting element successively, and thus form the various layers of the electric cable of the invention.

They may alternatively be extruded concomitantly by co-extrusion using a single extruder head, co-extrusion being a method that is well known by a person skilled in the art.

Whether in the step of formation of the granules or in the step of extrusion on the cable, the operating conditions are familiar to a person skilled in the art. Notably, the temperature inside the mixing or extrusion device may be above the melting point of the predominant polymer or of the polymer having the highest melting point, among the polymers used in the composition to be employed.

BRIEF DESCRIPTION OF THE DRAWINGS

FIG. 1 shows an electric cable in accordance with one embodiment.

DETAILED DESCRIPTION

Examples

FIG. 1 shows a schematic view of an electric cable according to a preferred embodiment of the invention.

For reasons of clarity, only the elements essential for understanding the invention have been shown schematically, and they are not drawn to scale.

The medium-voltage or high-voltage electric cable 1 according to the first object of the invention, illustrated in FIG. 1, comprises a central elongated electrically conducting element 2, notably made of copper or aluminium. The electric cable 1 further comprises several layers arranged successively and coaxially around this central elongated electrically conducting element 2, namely: a first semiconducting layer 3 called "internal semiconducting layer", an electrically insulating layer 4, a second semiconducting layer 5 called "external semiconducting layer", a metal screen 6 for earthing and/or protection, and an outer protective sheath 7.

The electrically insulating layer 4 is a non-crosslinked extruded layer, obtained from the polymer composition as defined in the invention.

The semiconducting layers 3 and 5 are thermoplastic (i.e. non-crosslinked) extruded layers.

The presence of the metal screen 6 and outer protective sheath 7 is preferred, but not essential, this cable structure being well known per se by a person skilled in the art.

Polymer Compositions

A composition I1 according to the invention, i.e. comprising at least one polypropylene-based thermoplastic polymer material and at least aluminium oxide as inorganic filler, was compared against a comparative composition C1, the composition C1 corresponding to a composition comprising a polypropylene-based thermoplastic polymer material identical to that used for the composition of the invention I1 but comprising kaolin as inorganic filler, instead of aluminium oxide.

Table 1 below presents polymer compositions, with the amounts of the compounds expressed in percentages by weight, relative to the total weight of the polymer composition.

TABLE 1

| Polymer compositions | C1 (*) | I1 |
| --- | --- | --- |
| Heterophase propylene copolymer | 15 | 29 |
| Random propylene copolymer | 44 | 29 |
| High-density polyethylene | 21.5 | 21.5 |
| Inorganic filler: kaolin | 15 | 0 |
| Inorganic filler: aluminium oxide | 0 | 15 |
| Dielectric liquid | 4.5 | 4.5 |
| Antioxidant | 1.0 | 1.0 |

(*) Comparative composition not forming part of the invention

The origin of the compounds in Table 1 is as follows:

high-density polyethylene marketed under the reference Eltex A4009MFN1325 by the company Ineos and the density of which is 0.960 g/cm$^3$ according to standard ISO 1183A at a temperature of 23° C. (MFI=0.9), and the elastic modulus is 1700 MPa;

heterophase propylene copolymer marketed by the company Basell Polyolefins under the reference Adflex® Q 200F;

random propylene copolymer marketed by the company Borealis under the reference Bormed® RB 845 MO;

dielectric liquid comprising 95 wt % of a mineral oil marketed by the company Nynas under the reference Nytex 810, and 5 wt % of benzophenone marketed by the company Sigma-Aldrich under the reference B9300, relative to the total weight of the dielectric liquid;

antioxidant marketed by the company Ciba under the reference Irganox B 225, which comprises an equimolar mixture of Irgafos 168 and Irganox 1010;

chalk as inorganic filler marketed under the reference Omya EXH1, and aluminium oxide as inorganic filler marketed under the reference P122SB or Timal-12.

2. Preparation of the Non-Crosslinked Layers

The compositions presented in Table 1 are used as follows.

The following constituents: mineral oil, antioxidant and benzophenone of compositions C1 and I1 referred to in Table 1, for each layer to be considered, are metered and mixed with stirring at about 75° C., to form a liquid mixture comprising the dielectric liquid.

The liquid mixture is then mixed with the following constituents: heterophase propylene copolymer, random propylene copolymer, high-density polyethylene compositions C1 and I1 referred to in Table 1, for each polymer layer to be considered, in a vessel. Then the resultant mixture and the inorganic filler, for each polymer layer to be considered, are homogenized using a twin-screw extruder ("Berstorff twin screw extruder") at a temperature of about 145 to 180° C., and then melted at about 200° C. (screw speed: 80 rev/min).

The homogenized and melted mixture is then granulated.

The granules were then pressed hot to form layers in the form of plates.

Each of the polymer compositions C1 and I1 was prepared in this way in the form of layers with a thickness of 1 mm for evaluating their mechanical properties as well as layers with a thickness of 8 mm for carrying out the measurements of thermal conductivity.

These compositions C1 and I1 were then compared from the standpoint of their mechanical properties (tensile strength/elongation at break before and after ageing at 135° C. for 240 hours) and their thermal conductivity.

The tests of tensile strength (TS) and elongation at break (EB) were carried out on the materials according to standard NF EN 60811-1-1, using an instrument marketed under the reference 3345 by the company Instron.

The results corresponding to each of these tests are reported in Table 2 (mechanical properties) below:

TABLE 2

| Properties | C1 (*) | I1 |
|---|---|---|
| TS (MPa) | 13.5 | 19.5 |
| EB (%) | 445 | 692 |
| TS after ageing (MPa) | 15.1 | 19.2 |
| EB after ageing (%) | 372.75 | 613.93 |

(*) Comparative composition not forming part of the invention

All these results show that incorporating an inorganic filler as defined in the invention in a polypropylene matrix improves the mechanical properties of the electrically insulating layer, notably in terms of tensile strength and elongation at break, including after ageing.

The tests of thermal conductivity were carried out on the materials according to the familiar method known by the English term "Transient Plane Source or TPS", using an instrument marketed under the reference HOT DISK TPS 2500S by the company THERMOCONCEPT.

The results corresponding to these tests are reported in Table 3 (thermal conductivity) below:

TABLE 3

| Properties | C1 (*) | I1 |
|---|---|---|
| Thermal conductivity at 40° C. (W/m · K) | 0.28 | 0.31 |

(*) Comparative composition not forming part of the invention

The results for thermal conductivity show that the presence of an inorganic filler as defined in the invention in a polypropylene matrix leads to an electrically insulating layer having a thermal conductivity greater than that of an electrically insulating layer in which the inorganic filler is chalk.

The invention claimed is:

1. An electric cable comprising:
   at least one elongated electrically conducting element; and
   at least one electrically insulating layer obtained from a polymer composition, said polymer composition comprising:
   a dielectric fluid,
   at least two different polypropylene-based thermoplastic polymer materials that are two different heterophase propylene copolymers,
   at least one polyethylene thermoplastic polymer material; and
   at least 10 wt % of inorganic filler relative to the total weight of the polymer composition,
   wherein the inorganic filler is calcined aluminium oxide.

2. The electric cable according to claim 1, wherein the inorganic filler is in the form of particles ranging in size from 0.01 to 6 μm.

3. The electric cable according to claim 1, wherein the at least one polyethylene thermoplastic polymer material of the polymer composition is high density polyethylene.

4. The electric cable according to claim 1, wherein the electrically insulating layer is a non-crosslinked layer.

5. The electric cable according to claim 1, wherein the electrically insulating layer has a tensile strength before or after ageing of at least 8.5 MPa.

6. The electric cable according to claim 1, wherein the electrically insulating layer has an elongation at break before or after ageing of at least 250%.

7. An electric cable comprising:
   at least one semiconducting layer surrounding the elongated electrically conducting element, and
   said at least one electrically insulating layer surrounding the elongated electrically conducting element,
   the electrically insulating layer being as defined in claim 1.

8. A method of manufacturing said electric cable as defined in claim 1, wherein said method comprises at least one step 1) of extrusion of the polymer composition around the elongated electrically conducting element, to obtain said electrically insulating layer surrounding said elongated electrically conducting element.

* * * * *